United States Patent

Rodriguez et al.

[15] 3,662,365

[45] May 9, 1972

[54] DYNAMIC AMPLITUDE CONTROL FOR MAGNETIC TAPE SYSTEMS

[72] Inventors: Juan A. Rodriguez, Boulder; Roger A. Monroe, Longmont, both of Colo.

[73] Assignee: Storage Technology Corporation, Boulder, Colo.

[22] Filed: Mar. 23, 1970

[21] Appl. No.: 21,826

[52] U.S. Cl. ....................340/174.1 H, 179/100.2 K, 330/29

[51] Int. Cl. ....................G11b 5/02, H03g 3/30

[58] Field of Search ............179/100.2 MI, 100.2 K, 100.2 B; 340/174.1 H, 174.1 B; 330/145, 86, 29

[56] References Cited

UNITED STATES PATENTS

| | | | |
|---|---|---|---|
| 3,430,215 | 2/1969 | Krossa et al. | 340/174.1 H |
| 3,153,702 | 10/1969 | Janowsky et al. | 179/100.1 TD |
| 3,331,030 | 7/1967 | Jordan et al. | 330/145 |

*Primary Examiner*—Bernard Konick
*Assistant Examiner*—Jay P. Lucas
*Attorney*—Woodcock, Washburn, Kurtz & Mackiewicz

[57] ABSTRACT

A magnetic tape system in which read heads sense signal fluctuations in the tracks in a moving magnetic tape includes dynamic amplitude control. The signals from a plurality of tracks are averaged and compared to predetermined levels. A digital counter is set in accordance with the level of the average signal. The digital counter changes the gain of the signal produced by the magnetic head. Gain changes are made only upon the occurrence of the end of the record being read.

4 Claims, 2 Drawing Figures

DYNAMIC AMPLITUDE CONTROL FOR MAGNETIC TAPE SYSTEMS

BACKGROUND OF THE INVENTION

This invention relates to magnetic tape systems and more particularly to dynamic amplitude control for such a system.

In the first magnetic tape reading systems, the amplitude of the signal on each of the read buses was adjusted by potentiometers on the amplifiers in each track. This technique of amplitude control was successful particularly where an NRZI method of encoding the data was used. The magnetic tapes developed for NRZI recording had a relatively tight tolerance (plus or minus 10 percent) on their output. Because of the intrinsic recording characteristics, variations in read/write head characteristics and nominal current variations in the write amplifiers were such as to have little or no effect on the tape signal output. Because of the intrinsic characteristics of NRZI recording, head wear also produced minimal degradation of head output. The effect of head wear was so small and gradual that normal preventive maintenance was all that was needed to maintain the read bus output at or hear nominal voltage level.

However, the adjustment of the amplitude of the read bus signal by potentiometers is not satisfactory with phase encoded data. Large output variations are experienced with phase encoded tapes. The present limit on the variations of signal amplitude for data interchange tapes is plus 50 percent, minus 35 percent.

Because of the foregoing, dynamic amplitude control is required to adjust the read bus amplitudes. The dynamic amplitude control of the signal on the read bus of a magnetic tape system presents problems which are different from those of the normal automatic gain control of, for example, an amplifier channel. One of the problems is that it is desirable to adjust the gain of the read bus channel only once for each record. Normally, variations within the record will not be great; on the other hand, changes in gain during the reading of a record may lead to detection errors. Another problem is that the reading of a record may be intermittent. For example, one portion of the record may be read, then another portion will be read a long period of time later, for example, minutes or hours later. When reading the second portion, it is desired that approximately the same amplitude of signal be present that was detected in reading the first portion of the record.

SUMMARY OF THE INVENTION

In accordance with an important aspect of this invention, a dynamic amplitude control circuit is provided for each one of the tape units connected to a common read bus. Each dynamic amplitude circuit includes a digital counter which stores a gain control signal representing the amplitude of the last recorded signal being read by that tape unit. The gain control signal is stored in the digital counter and is used in setting the gain for that tape unit when the next portion of the record is read, regardless of the period of time which elapses before reading the next portion.

In accordance with another important aspect of this invention, changes in the gain for a particular unit are made only at the end of a record. This prevents changes in the amplitude of the signals applied to the read bus during the reading of a particular record.

In accordance with another important aspect of this invention, the gain control signal is obtained from the average of the signals from a plurality of the tracks of the tape unit.

In one specific embodiment of the invention, the recorded signals sensed in three tracks are averaged together. The averaged signal is applied to three comparators which compare the average signal to three predetermined levels. The outputs of the comparators are used to set an up-down digital counter. The counter is set through logic circuitry which is enabled only upon the occurrence of the end of the record signal. The outputs of the digital counter are used to set the gain of a gain-changing circuit connected between the read head and the read bus.

The foregoing and other objects, features and advantages of the invention will be better understood from the following more detailed description, drawings, and appended claims.

DESCRIPTION OF A PARTICULAR EMBODIMENT

Figure 1:
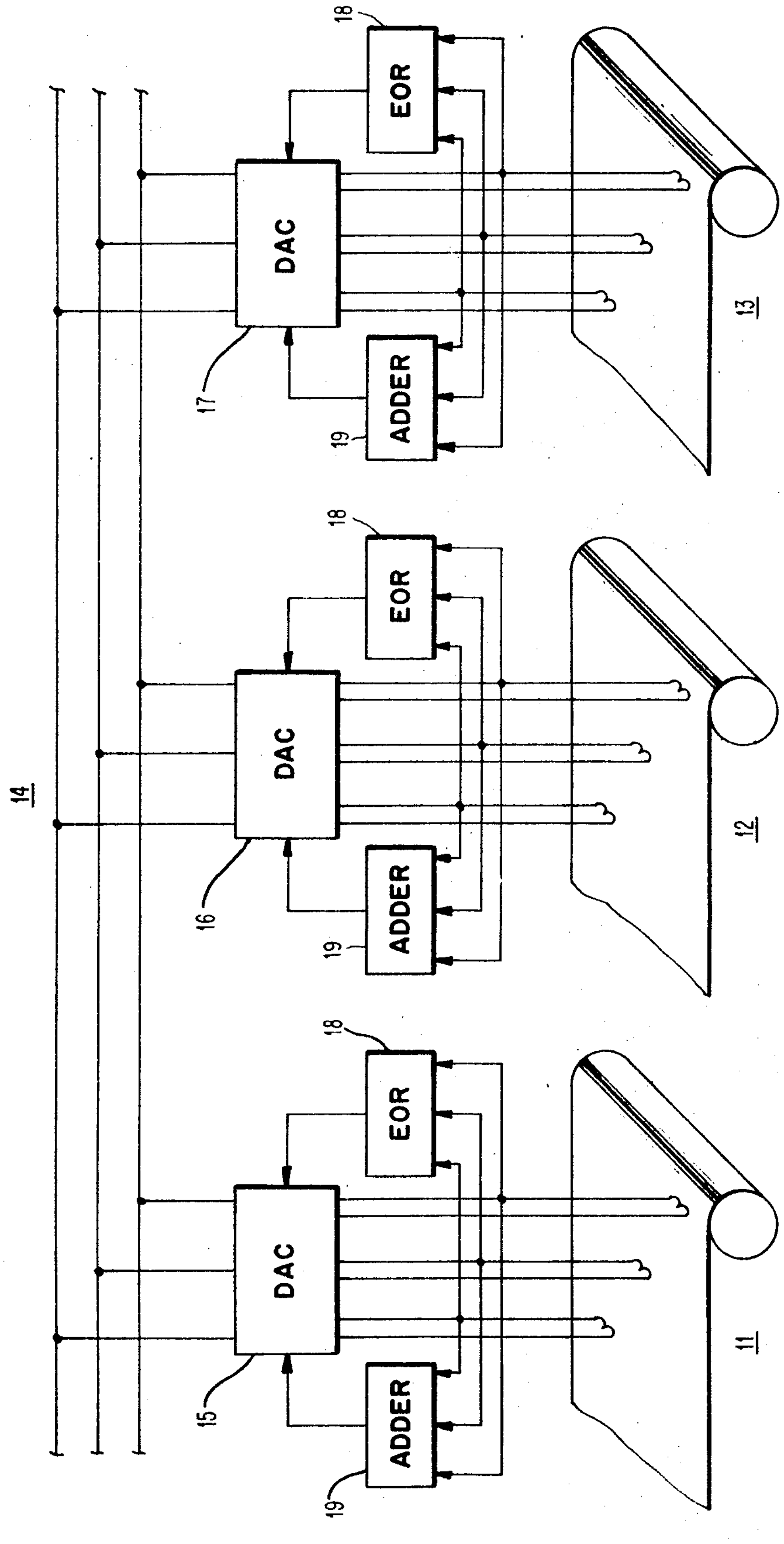
FIG. 1 shows a block diagram of a magnetic tape system.

FIG. 1 shows a plurality of magnetic tape units 11–13 all having their outputs connected to a common read bus 14. In general, about 8 magnetic tape units are connected to a common read bus for conveying signals to a digital computer. The use of automatic gain control amplifiers in the tape drive, has not completely solved the problem of variations in signal strength along the read bus channel.

In accordance with the present invention each tape unit has a dynamic amplitude control system as indicated at 15–17. Each dynamic amplitude control system includes a digital counter which stores and holds a count signal representing the summed signal amplitude of the last or previous data record read as provided by an adder 19. The gain of the recorded information bearing signals is adjusted in accordance with the value in the digital counter and the next data record is then read. The gain control signal remains in the counter even for long periods of time before the next data record is read while other tape units are operating and impressing signals on the read bus.

The gain control signal in the digital counter is changed only at the end of each successive data record. As indicated in FIG. 1 an end of record sensor 18 detects the end of the record and enables the logic circuitry in the dynamic amplitude control 15. (While the end of record sensor has been schematically shown for each tape unit, normally, of course, the end of record will be detected in the digital computer or tape control unit and transmitted to the tape unit).

Figure 2:
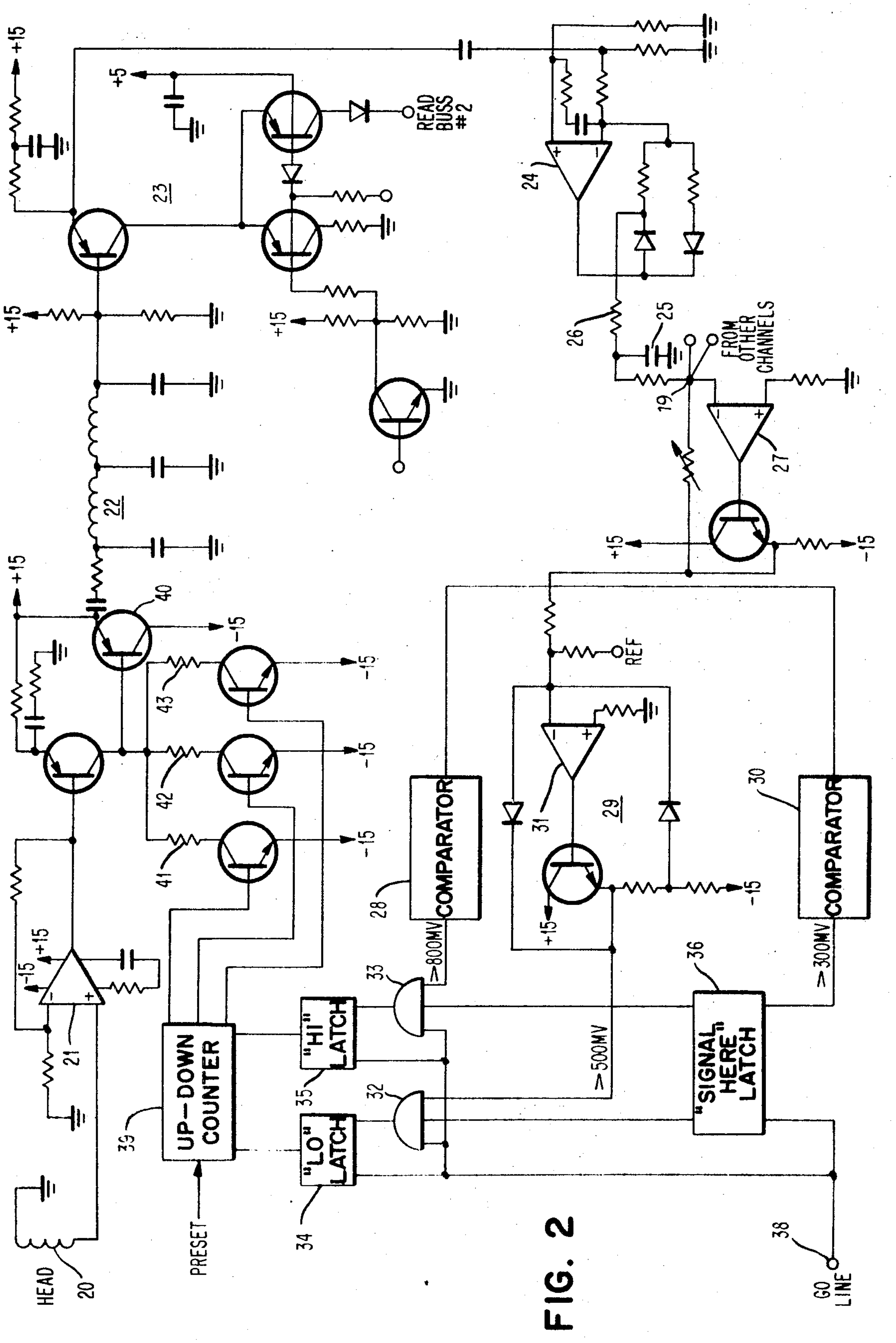
FIG. 2 shows a block diagram of the dynamic amplitude control circuit.

Referring to FIG. 2 the recorded signal from the read head 20 is applied through amplifier 21, low pass filter 22, and transistor amplifier 23 to the read bus. The transistor 23 isolates the unit from the read bus. If the power is removed from the unit, for example during servicing, the transistor 23 becomes back biased and prevents fluctuations in the circuit from being impressed on the read bus.

The average value of the signal from read head 20 is determined separately. This is done by the amplifier 24 which, together with associated circuitry, half-wave rectifies the recorded signal. A peak value holding circuit includes the capacitor 25 and resistor 26. The circuit including capacitor 25 and resistor 26 integrates the signal so that minor fluctuations in the signal level are smoothed.

The recorded signals from three tracks are summed at the adder junction 19 and averaged in a circuit which includes the operational amplifier 27. In a specific embodiment of the invention the signals from two tracks next to the outside of the tape and a track from the center of the tape are averaged. The output of amplifier 27 is the gain control signal.

The gain control signal is compared to three separate reference voltages. This comparison determines if the signal on the read bus is greater than 300 millivolts, greater than 500 millivolts, or greater than 800 millivolts. Comparator 28 indicates if the signal is greater than 800 millivolts, comparator 29 indicates if it is greater than 500 millivolts, and comparator 30 indicates if it is greater than 300 millivolts. Each comparator includes an operational amplifier, for example, the operational amplifier 31.

In the system under consideration the nominal amplitude on the read bus is 650 millivolts. The outputs of the comparators are decoded by logic circuitry including the AND gates 32 and 33 and the latches 34–36. If the read bus signal is less than 300 millivolts, no correction is made to the gain of the amplifier. A signal level below 300 volts is not corrected since this normally represents a temporary loss of signal and is not a result of a low signal tape.

When the signal level is between 300 and 500 millivolts, the "signal low" line, the output of latch 34, is activated.

Signals between 500 and 800 millivolts are not altered; this is the acceptable level.

Signals greater than 800 millivolts activate the "signal high" line which is the output of latch 35.

The logic circuit is enabled by a pulse on the line 38 which indicates an end of record. The gain is changed only at the end of the record. At this time, the signals in the latches 34 and 35 are applied as inputs to an up-down counter 39. The fall of the high line, the output of latch 35, decreases the count in counter 39 by 1. The fall of the "low" line, the output latch 34, increases the count in the counter 39 by 1. The counter 39 is normally preset to 4.

The actual gain change is accomplished by changing the gain of amplifier 40. Resistors 41–43 are connected in the feedback circuit of the amplifier. These resistors are selectively switched into the circuit by the counter 39. The selective switching of resistors 41–43 selects any one of eight different gain settings for the amplifier 40.

The operation of the Dynamic Amplitude Control is as follows. Assume that a tape unit, such as the tape unit 11 (FIG. 1), is reading a record. Signals from three tracks on the tape are each separately averaged and applied to the amplifier 27, (FIG. 2). The output of amplifier 27 is the average value of the signals from the three tracks. The output of amplifier 27 is the gain control signal. This signal is compared to three levels by comparators 28–30.

At the end of the record, a pulse is applied to line 38. In response to this end of record pulse, the digital counter 39 is set in accordance with the magnitude of the gain control signal as determined by comparators 28–30. If the gain control signal is greater than 800 millivolts, the counter is decremented by one count. If the gain control signal is between 300–500 millivolts, the count in digital counter 39 is increased by 1.

The outputs of digital counter 39 selectively change the gain setting of the amplifiers in the channels between each of the read heads and the read bus. For example, the gain of amplifier 40, between head 20 and the read bus, is selectively changed by switching resistors 41–43 into the feedback circuit of amplifier 40.

This gain setting is used during the reading of the next record. Even if there is a long delay before reading the next record, or a long delay in the middle of the record, the gain setting specified by digital counter 39 will be used. There will not be another gain change until the end of the record.

While a particular embodiment of the invention has been shown and described, various modifications may be made without departing from the principles of the invention. The appended claims are, therefore, intended to cover any such modifications within the true spirit and scope of the invention.

What is claimed is:

1. In a magnetic tape system of the type having a plurality of magnetic tape units connected to a common read bus, a dynamic amplitude control system for each magnetic tape unit comprising:

at least one magnetic read head for sensing data records of information-bearing signals successively recorded in a plurality of tracks on a moving magnetic tape, means for producing a gain control signal representing the amplitude of the recorded signals being sensed during the reading of each data record, a digital counter for storing a count during the reading of one data record corresponding to the gain control signal produced during the reading of the previous data record, means for setting said counter for the reading of the next data record in accordance with the magnitude of said gain control signal produced during the reading of said one data record, and gain control means connected between said read heads and said read bus for changing the gain of the signal applied to said read bus in accordance with the setting of said counter.

2. The system recited in claim 1 further including:

means for producing a signal indicating the end of said one record and, means for changing the setting of said counter only upon receipt of the end of record signal.

3. The system recited in claim 1 wherein said means for producing a gain control signal includes:

means for averaging the signals from a plurality of said tracks.

4. The system recited in claim 3 further comprising:

comparators for comparing the averaged signal to reference levels, said means for setting said counter including logic circuitry for setting said counter in accordance with the magnitude of said averaged signal relative to said reference levels.

* * * * *